United States Patent
Kim et al.

(10) Patent No.: US 11,747,442 B2
(45) Date of Patent: Sep. 5, 2023

(54) METHOD AND APPARATUS WITH RADAR DATA RECOGNITION

(71) Applicant: Samsung Electronics Co., Ltd., Suwon-si (KR)

(72) Inventors: Insoo Kim, Seongnam-si (KR); Seungju Han, Seoul (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 291 days.

(21) Appl. No.: 17/019,672

(22) Filed: Sep. 14, 2020

(65) Prior Publication Data

US 2021/0181306 A1    Jun. 17, 2021

(30) Foreign Application Priority Data

Dec. 11, 2019  (KR) .................. 10-2019-0164500
Apr. 6, 2020  (KR) .................. 10-2020-0041721

(51) Int. Cl.
*G01S 7/41* (2006.01)
*G06F 21/44* (2013.01)

(52) U.S. Cl.
CPC .............. *G01S 7/412* (2013.01); *G06F 21/44* (2013.01)

(58) Field of Classification Search
CPC ................................. G01S 7/412; G06F 21/44
See application file for complete search history.

(56) References Cited

U.S. PATENT DOCUMENTS

| | | | |
|---|---|---|---|
| 10,106,153 B1 | 10/2018 | Xiao et al. | |
| 2011/0182469 A1 | 7/2011 | Ji et al. | |
| 2013/0015946 A1* | 1/2013 | Lau .................. | G07C 9/00 340/5.2 |
| 2018/0046255 A1 | 2/2018 | Rothera et al. | |
| 2018/0349477 A1 | 12/2018 | Jaech et al. | |
| 2019/0147372 A1* | 5/2019 | Luo .................. | G06N 20/00 706/20 |
| 2019/0279366 A1 | 9/2019 | Sick et al. | |
| 2020/0333457 A1* | 10/2020 | Bialer .................. | G01S 7/352 |
| 2020/0355817 A1* | 11/2020 | Gillian .................. | G01S 7/403 |

FOREIGN PATENT DOCUMENTS

| | | |
|---|---|---|
| CN | 109086700 A | 12/2018 |
| CN | 106127725 B | 1/2019 |
| CN | 110109109 A | 8/2019 |
| DE | 10 2018 203 591 B3 | 7/2019 |
| JP | 2019-25044 A | 2/2019 |
| WO | WO 2019/195327 A1 | 10/2019 |

OTHER PUBLICATIONS

EESR dated Apr. 26, 2021 issued in counterpart European Patent Application No. 20202512.8 (15 pages in English).

* cited by examiner

*Primary Examiner* — Peter M Bythrow
*Assistant Examiner* — Nazra Nur Waheed
(74) *Attorney, Agent, or Firm* — NSIP Law

(57) ABSTRACT

A processor-implemented radar data recognition method includes: generating a plurality of pieces of input data, with respectively different dimension configurations, based on radar data of an object; and outputting a recognition result of the object based on the generated plurality of pieces of input data using a recognition model.

22 Claims, 10 Drawing Sheets

METHOD AND APPARATUS WITH RADAR DATA RECOGNITION

CROSS-REFERENCE TO RELATED APPLICATIONS

This application claims the benefit under 35 USC § 119(a) of Korean Patent Application No. 10-2019-0164500, filed on Dec. 11, 2019, and Korean Patent Application No. 10-2020-0041721, filed on Apr. 6, 2020, in the Korean Intellectual Property Office, the entire disclosures of which are incorporated herein by reference for all purposes.

BACKGROUND

1. Field

The following description relates to a method and apparatus with radar data recognition.

2. Description of Related Art

To address an issue of classifying an input pattern as a predetermined group, an artificial neural network (ANN) may employ an algorithm with learning abilities. Through the algorithm, the ANN may generate mapping between input patterns and output patterns, and may have a generalization capability of generating a relatively correct output with respect to an input pattern that was not used for training.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented radar data recognition method includes: generating a plurality of pieces of input data, with respectively different dimension configurations, based on radar data of an object; and outputting a recognition result of the object based on the generated plurality of pieces of input data using a recognition model.

The generating of the plurality of pieces of input data may include generating, for each of the plurality of pieces of input data, an input map of a component of the radar data for each channel of the piece of input data, wherein each channel is dependent on another portion of the component of the radar data.

The component of the radar data may include any one of an angle component, a velocity component, and a time change component of the radar data, and the other component of the radar data may include any other one of the angle component, the velocity component, and the time change component of the radar data of the radar data.

An input map of one of the plurality of pieces of input data may have a same dimension as one or more dimensions of an input map of another one of the plurality of pieces of input data.

A dimension of an input map of one or more of the plurality of pieces of input data may be a dimension of a time frame.

The generating of the plurality of pieces of input data may include generating the plurality of pieces of input data configured with a combination of an angle dimension, a range-velocity dimension, and a time frame dimension based on the radar data.

The generating of the plurality of pieces of input data may include generating, based on the radar data: first input data of the input data comprising a first input map with the angle dimension and the range-velocity dimension for each time frame channel of the first input data; second input data of the input data comprising a second input map with the time frame dimension and the range-velocity dimension for each angle channel of the second input data; and third input data of the input data comprising a third input map with the time frame dimension and the angle dimension for each range-velocity channel of the third input data.

The angle dimension may be determined based on a total number of transmission antennas and reception antennas included in the radar sensor, the range-velocity dimension may be determined based on a total number of burst signals included in a frame signal of the radar data, and the time frame dimension may be determined based on a total number of frame signals included in a series of frame signals of the radar data.

The outputting of the recognition result may include: extracting a plurality of pieces of feature data from the plurality of pieces of input data using a plurality of feature extraction models included in the recognition model; and generating the recognition result based on the plurality of pieces of extracted feature data.

The extracting of the plurality of pieces of feature data may include: extracting first feature data of the feature data from first input data of the input data using a first feature extraction model; extracting second feature data of the feature data from second input data of the input data using a second feature extraction model; and generating the recognition result based on the first feature data and the second feature data.

The extracting of the plurality of pieces of feature data may include extracting the plurality of pieces of feature data by applying a convolution filtering to the plurality of pieces of input data.

The extracting of the plurality of pieces of feature data may include extracting the plurality of pieces of feature data from each of the plurality of pieces of input data by performing a convolution operation by sweeping an input map of each channel with a different kernel filter for each channel.

Each of the plurality of feature extraction models may include differently trained parameters.

Each of the plurality of feature extraction models may include one or more convolution layers.

The generating of the recognition result may include: generating combined feature data by fusing the plurality of pieces of extracted feature data; and generating the recognition result based on the combined feature data.

The generating of the combined feature data may include summing corresponding elements of the plurality of pieces of extracted feature data.

The generating of the recognition result may include generating the recognition result by propagating the combined feature data to a shared layer of the recognition model.

The outputting of the recognition result may include outputting, as the recognition result, authenticity information indicating whether the object is a real object or a fake object.

The method may include: granting an authority based on the recognition result; and permitting an access to either one or both of data and an operation of an electronic terminal based on the granted authority.

The granting of the authority may include granting the authority in response to a verification that a user is registered in the electronic terminal and the object is a real object based on the recognition result, and the permitting of the access may include unlocking a locked state of the electronic terminal based on the authority.

The method may include: in response to the recognition result being generated, visualizing the recognition result using a display.

A non-transitory computer-readable storage medium may store instructions that, when executed by a processor, configure the processor to perform the method.

In another general aspect, an apparatus includes: a radar sensor configured to acquire radar data of an object; and a processor configured to generate a plurality of pieces of input data with different dimension configurations based on the radar data, and output a recognition result of the object based on the generated plurality of pieces of input data using a recognition model.

The apparatus may include: a user interface, wherein the processor is configured to permit an access to an operation of the user interface based on the recognition result.

In another general aspect, a processor-implemented radar data recognition method includes: acquiring first, second, and third components of radar data of an object from a radar sensor; generating first input data comprising first input maps of the first and second components, wherein each of the first input maps corresponds to a respective value of the third component; generating second input data comprising second input maps of the third component and either one of the first and second components, wherein each of the second input maps corresponds to a respective value of the other one of the first and second components; and generating a recognition result of the object based on the generated plurality of pieces of input data using a recognition model.

The first, second, and third components of the radar data may each be respective ones of a range component, an angle component, a frame component, a velocity component, and a range-velocity component of the radar data.

Other features and aspects will be apparent from the following detailed description, the drawings, and the claims.

Figure 1:
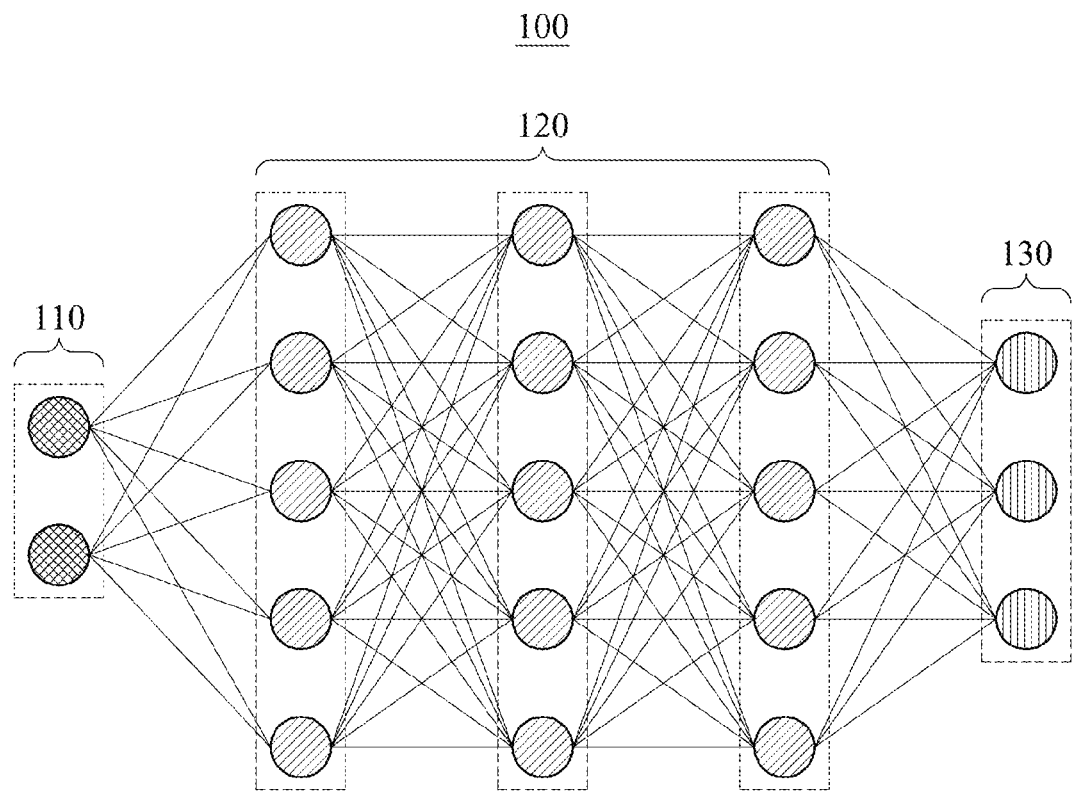
FIG. 1 illustrates an example of a neural network as a structure of a recognition model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

It will be understood that when a component is referred to as being "connected to" another component, the component can be directly connected or coupled to the other component or intervening components may be present.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein. The use of the term "may" herein with respect to an example or embodiment (for example, as to what an example or embodiment may include or implement) means that at least one example or embodiment exists where such a feature is included or implemented, while all examples are not limited thereto.

Hereinafter, examples will be described in detail with reference to the accompanying drawings, and like reference numerals in the drawings refer to like elements throughout.

FIG. 1 illustrates an example of a neural network as a structure of a recognition model.

A radar data recognition apparatus may recognize an object (for example, a user) based on feature data extracted from input data. The input data may be data generated from radar data, non-limiting examples of which will be described below with reference to FIG. 2. For example, the radar data recognition apparatus may extract feature data from input data using a feature extraction model included in a recognition model. The feature data may be abstracted data of the input data, and may be represented, for example, in a form of a vector. The feature extraction model may be a model configured to extract feature data from input data, and the recognition model may be a model that includes the feature extraction model and that is configured to output a recognition result based on the feature data extracted by the feature extraction model. For example, the recognition model may be provided in a machine learning structure and include a neural network 100.

The neural network 100 may correspond to an example of a deep neural network (DNN). The DNN may include, for example, a fully connected network, a deep convolutional network, and/or a recurrent neural network (RNN). The neural network 100 may map, based on deep learning, input data and output data that are in a non-linear relationship, to perform, for example, an object classification, an object recognition, a speech recognition, and/or a radar image recognition. In an example, deep learning may be a machine learning scheme to perform object recognition from a large data set. Through supervised or unsupervised learning, input data and output data may be mapped to each other.

In the following description, a recognition may include a verification of data and/or an identification of data.

The verification may be an operation of determining whether input data is true or false. The radar data recognition apparatus may verify whether data extracted and acquired from input data is the same as data enrolled in advance in the radar data recognition apparatus, and may determine that verification with respect to a user corresponding to the input data is successful in response to verification that the extracted data and the enrolled data are the same. However, examples are not limited thereto. For example, when a plurality of pieces of enrolled data are stored in the radar data recognition apparatus, the radar data recognition apparatus may sequentially verify data extracted and acquired from input data with respect to each of the plurality of pieces of enrolled data.

The identification may be a classification operation of determining a label indicated by input data, among a plurality of labels. For example, each label may indicate a class (for example, an identity (ID) of each of enrolled users). For example, a liveness detection may be an operation of distinguishing a value (for example, "1") indicating that an object (for example, a face of a person) indicated by arbitrary input data is a real object from a value (for example, "0") indicating that the object is a fake object.

Referring to FIG. 1, the neural network 100 may include an input layer 110, a hidden layer 120 (for example, one or more hidden layers), and an output layer 130. Each of the input layer 110, the hidden layer 120, and the output layer 130 may include a plurality of artificial nodes. While the nodes may be referred to as "artificial nodes" or "neurons," such reference is not intended to impart any relatedness with respect to how the neural network architecture computationally maps or thereby intuitively recognizes information and how a human's neurons operate. I.e., the terms "artificial nodes" or "neurons" are merely terms of art referring to the hardware implemented nodes of a neural network.

For convenience of description, the hidden layer 120 may include three layers as shown in FIG. 1, however, example are not limited thereto, and the hidden layer 120 may include various number of layers without departing from the spirit and scope of the illustrative examples described. Although the neural network 100 of FIG. 1 may include the input layer 110 to receive input data, the input data may be directly input to the hidden layer 120 in an example. In the neural network 100, artificial nodes of a layer other than the output layer 130 may be connected to artificial nodes of a next layer via links to transmit output signals. A number of links connecting the artificial nodes of the layer to the artificial nodes of the next layer may correspond to a number of the artificial nodes of the next layer.

To each of artificial nodes included in the hidden layer 120, an output of an activation function associated with weighted inputs of artificial nodes included in a previous layer may be input. The weighted inputs may be obtained by multiplying a weight to inputs of the artificial nodes included in the previous layer. The weight may be referred to as a parameter of the neural network 100. The activation function may include, for example, a sigmoid function, a hyperbolic tangent (tan h) function, and/or a rectified linear unit (ReLU) function. A nonlinearity may be formed in the neural network 100 by the activation function. To each of artificial nodes included in the output layer 130, weighted inputs of artificial nodes included in a previous layer may be input.

When input data is provided, the neural network 100 may calculate a function value based on a number of classes to be identified in the output layer 130 through the hidden layer 120, and may identify the input data with a class having a greatest value among the classes. The neural network 100 may identify input data, however, examples are not limited thereto. For example, the neural network 100 may also verify the input data. The following description of the recognition process will be directed to a liveness verification process. However, the following description of the recognition process may also apply to a verification and identification process without departing from the spirit of the present disclosure.

When a width and a depth of the neural network 100 are sufficiently great, the neural network 100 may have a capacity large enough to implement an arbitrary function. When the neural network 100 learns a sufficiently large quantity of training data through an appropriate learning process, an optimal recognition performance may be achieved.

Although the neural network 100 has been described above as an example of a feature extraction model and an example of the recognition model, the feature extraction model and the recognition model are not limited to the neural network 100. Hereinafter, a recognition operation using a recognition model will be described.

Figure 2:
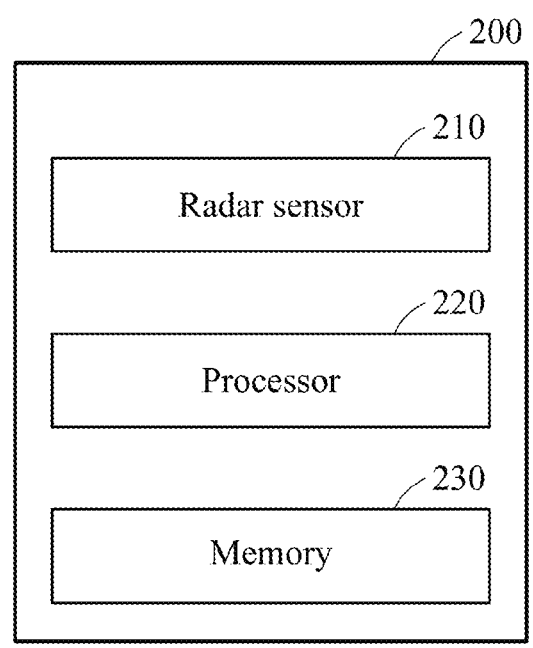
FIG. 2 illustrates an example of a radar data recognition apparatus.

FIG. 2 illustrates an example of a radar data recognition apparatus 200 (for example, the radar data recognition apparatus described above with reference to FIG. 1).

Referring to FIG. 2, the radar data recognition apparatus 200 may include a radar sensor 210, a processor 220, and a memory 230.

The radar sensor 210 may acquire radar data of an object. The radar sensor 210 may transmit a radar transmission signal and receive a radar reception signal. For example, the radar sensor 210 may radiate a signal via one or more antennas of the radar sensor 210 and receive a signal via the one or more antennas. The one or more antennas of the radar sensor 210 may include at least one transmission antenna and at least one reception antenna. A radar signal transmitted by each transmission antenna may be sensed as an individually different signal in each reception antenna. For example, when "N" transmission antennas and "M" reception antennas are included in the radar sensor 210, the radar sensor 210 may sense "N×M" pulse signals in total as radar reception signals. In this example, N and M are integers greater than or equal to "1".

A signal radiated by the radar sensor 210 and a signal received by the radar sensor 210 may be radar signals. Hereinafter, the signal radiated by the radar sensor 210 and the signal received by the radar sensor 210 may be referred to as a "radar transmission signal" and a "radar reception signal", respectively. The radar reception signal may include, for example, a signal corresponding to the radar transmission signal reflected from a target point after hitting the target point. The target point may be, for example, a point from which a radar signal is reflected, and may include, for example, a point on an object. The radar sensor 210 may include, for example, a millimeter wave (mm-Wave) radar, and may be implemented as, for example, a frequency-modulated continuous-wave radio detection and ranging (FMCW radar). A range to the target point, an angle of the target point, and a velocity of the target point may be calculated from a change in a signal waveform and a time of flight (TOF) that a radiated electric wave returns after hitting the target point in radar data, non-limiting examples of which will be described below with reference to FIGS. 4 and 5. The radar data may be data generated from the radar reception signal. For example, the radar sensor 210 may generate radar data based on the radar reception signal. None-limiting examples of the radar data will be described below with reference to FIGS. 4 and 5.

The processor 220 may generate a plurality of pieces of input data with different dimension configurations from radar data. Non-limiting examples of the dimension configurations will be described below with reference to FIGS. 6 through 9. Also, the processor 220 may output a recognition result of an object based on the plurality of pieces of generated input data using a recognition model. The recognition result may include authenticity information indicating whether the object is a real object or a fake object, however, examples are not limited thereto. For example, the recognition result may include an identification result of an identity of an object, an identification result of a body part of the object, and/or a result obtained by verifying whether the object is an enrolled user.

The memory 230 may temporarily or permanently store data used to perform a radar data recognition method. Also, the memory 230 may store a recognition model, a feature extraction model, and a parameter corresponding to each of the recognition model and the feature extraction model. The memory 230 may store feature data extracted from the feature extraction model and a recognition result output from the recognition model.

Figure 3:
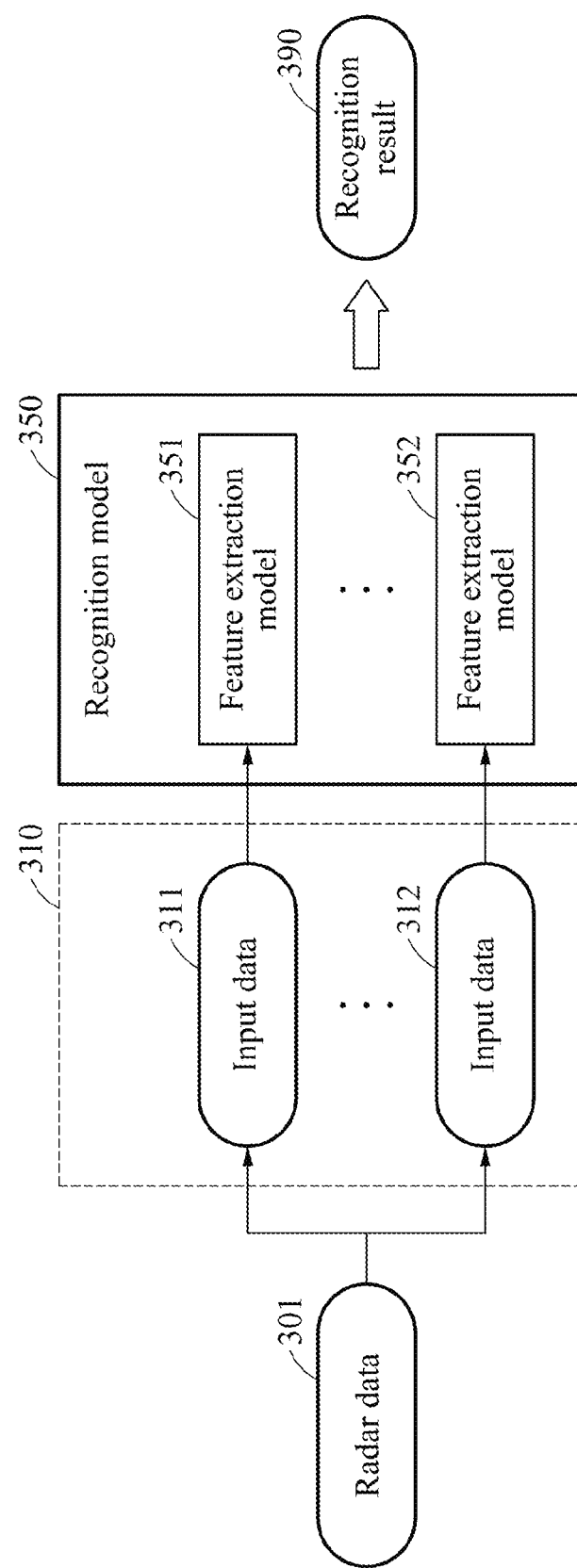
FIG. 3 illustrates an example of a process of generating a recognition result from radar data using a recognition model.

FIG. 3 illustrates an example of a process of generating a recognition result from radar data using a recognition model.

A radar data recognition apparatus (for example, the radar data recognition apparatus 200) may generate a plurality of pieces of input data 310 from radar data 301. The plurality of pieces of input data 310 may be generated with different dimension configurations, as described above. The radar data recognition apparatus may input the plurality of pieces of input data 310 to different feature extraction models (for example, feature extraction models 351 and 352). The radar data recognition apparatus may input input data 311 to the feature extraction model 351, and may input input data 312 to the feature extraction model 352. The radar data recognition apparatus may generate a recognition result 390 based on outputs of the feature extraction models 351 and 352 included in a recognition model 350. A feature extraction model may include at least one convolution layer. An output of a feature extraction model may be, for example, a result obtained by applying a convolution operation to data input to the feature extraction model by a kernel filter.

As shown in FIG. 3, the recognition model 350 may include a convolutional neural network (CNN) configured to receive and process inputs of input data with various dimension configurations (i.e., a "multi-directional CNN"). The multi-directional CNN of the recognition model 350 may be a bi-directional CNN, a tri-directional CNN, or greater. For reference, a bi-directional CNN will be described below with reference to FIG. 6, and a tri-directional CNN will be described below with reference to FIG. 7, as non-limiting examples of the multi-directional CNN.

Radar data may include range information, angle information, velocity information, and/or time change information. For example, in terms of signal processing of radar data, a range value of a range to a target point may be calculated based on the range information of the radar data, an angle value may be calculated based on the angle information, and/or a velocity value may be calculated based on the velocity information. Non-limiting examples of a pulse signal as a signal associated with the range information will be described below with reference to FIG. 4.

Figure 4:
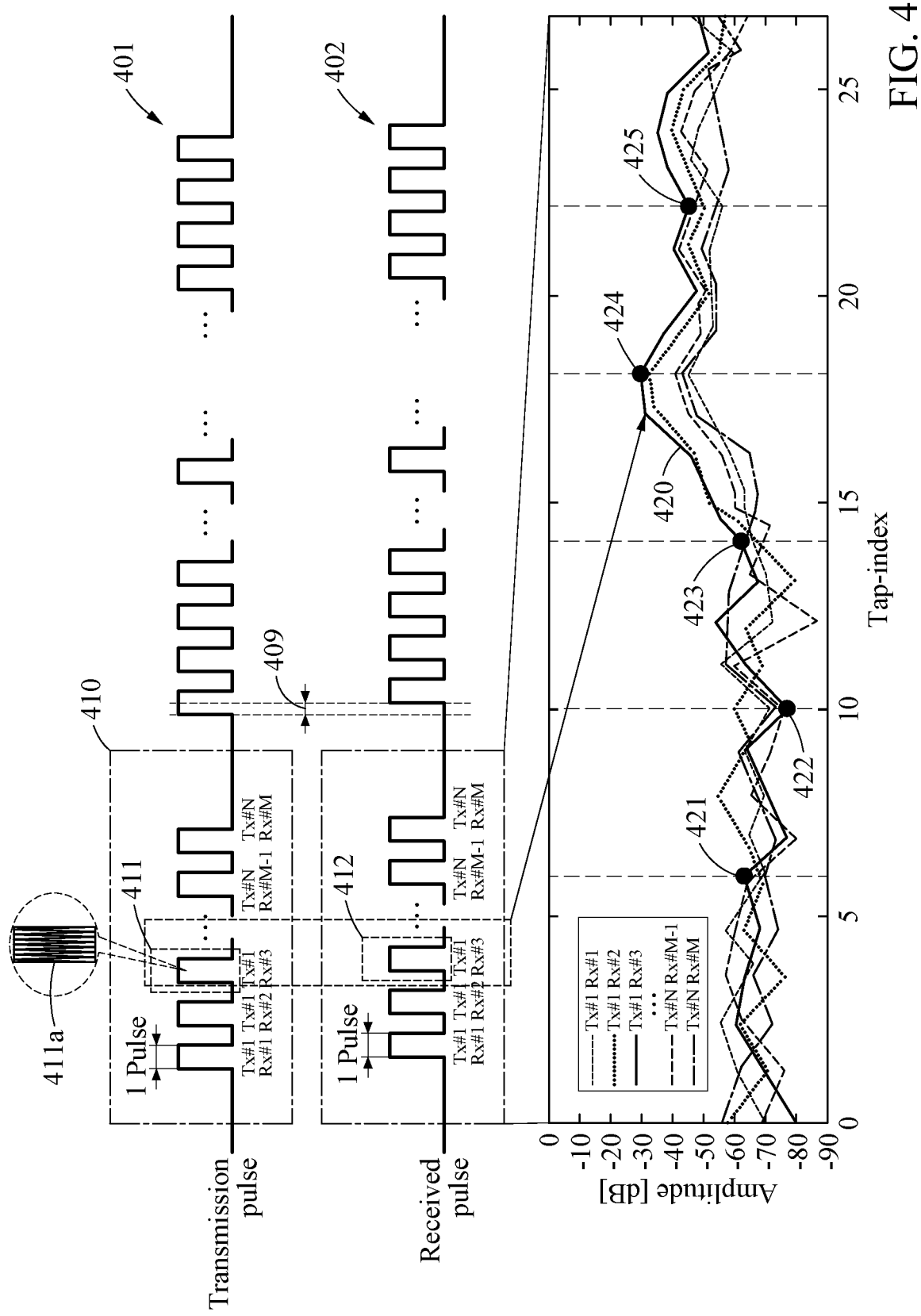
FIG. 4 illustrates an example of information associated with a pulse signal in radar data.

FIG. 4 illustrates an example of information associated with a pulse signal in radar data.

In an example, a radar sensor may include "N" radar transmitters (for example, transmission antennas) and "M" radar receivers (for example, reception antennas). In this example, N and M are integers greater than or equal to "1". Each of the "N" radar transmitters may transmit a radar transmission signal 411*a* based on a transmission pulse signal 411 corresponding to each of the "M" radar receivers. For example, the radar sensor may radiate, via a transmission antenna, the radar transmission signal 411*a* generated by modulating each transmission pulse signal 411 with a carrier frequency. However, the radar sensor is not limited to the above-described pulse radar, and may be an FMCW radar. In the FMCW radar, a carrier frequency may increase or decrease within an individual pulse interval. Although a pulse signal and a burst signal may be transmitted and received for convenience of description in the following description, it may be understood that the radar sensor may physically radiate the radar transmission signal 411*a* generated based on a pulse signal and receive a radar reception signal that corresponds to the radar transmission signal 411*a* reflected from a target.

A radar data recognition apparatus (for example, the radar data recognition apparatus 200) may identify an activated radar transmitter and an activated radar receiver and may distinguish radar reception signals. For example, when one of the "N" radar transmitters is being activated and one of the "M" radar receivers is being activated, the radar sensor may radiate the radar transmission signal 411*a* via the activated transmitter, and may receive the radar reception signal corresponding to the reflected radar transmission signal 411*a*, via the activated receiver. For example, when an i-th transmitter and a j-th receiver are being activated, the radar sensor may identify a received radar reception signal as a signal of Tx #i Rx #j. In this example, i is an integer greater than or equal to "1" and less than or equal to "N", and j is an integer greater than or equal to "1" and less than or equal to "M".

In an example, tap information 420 may be information indicating a delay difference 409 between an individual transmission pulse signal 411 and a reception pulse signal 412 corresponding to the transmission pulse signal 411, and may correspond to range information. Range information may be information associated with a range from a radar sensor to a target point. The range information may include, for example, information associated with a range component that may be used to calculate a range value. For example, a component dependent on a range to a target point among components of radar data may be referred to as a range component. The delay difference 409 between the transmission pulse signal 411 and the reception pulse signal 412 may be a component dependent on a range, when a delay occurs according to a range to a target between the radar transmission signal 411*a* and the radar reception signal when a radar signal reciprocates to the target.

The tap information 420 may be, for example, correlation information between the radar transmission signal 411*a* generated based on the transmission pulse signal 411 and the radar reception signal received by reflecting the radar transmission signal 411*a*. For example, the tap information 420 may include correlation amplitude values of the transmission pulse signal 411 and the reception pulse signal 412 for each of at least one tap index. The radar data recognition apparatus may calculate correlation amplitude values for a portion of tap indices, instead of calculating correlation amplitude values for each of all the tap indices, based on a target resolving power. Correlation information may be, but is not limited to, for example, an auto-correlation value and/or a cross-correlation value.

Although a reception pulse 402 corresponding to the radar reception signal is shown in FIG. 4 for intuitive description, the radar data recognition apparatus may not restore the reception pulse 402 from the radar reception signal. For example, the tap information 420 of FIG. 4 may be a graph of a correlation between the radar transmission signal 411*a* corresponding to the individual transmission pulse signal 411 and the radar reception signal corresponding to the reception pulse signal 412.

Although an example in which the tap information 420 is the correlation information has been mainly described for convenience of description, the tap information 420 is not limited thereto. For example, the tap information 420 may be information obtained by a frequency transform (for example, a fast Fourier transform (FFT)) from a beat signal generated by frequency mixing between the radar transmission signal 411*a* and the radar reception signal. In this example, the beat signal may be a signal with a beat frequency. The beat frequency may be a frequency difference between the radar transmission signal 411*a* and the radar reception signal.

The radar data recognition apparatus may calculate correlation graphs respectively corresponding to a plurality of pulse signals included in a unit burst signal 410. For example, the radar data recognition apparatus may generate a number of correlation graphs corresponding to a number of transmission antennas and a number of reception antennas with respect to the unit burst signal 410. A total of "N×M" pulses may be transmitted and received as unit burst signals 410 and a total of "N×M" correlation graphs are shown in FIG. 4. The radar data recognition apparatus may select at least a portion of correlation values from each of the correlation graphs and may generate the tap information 420. As described above, the radar sensor may transmit and receive the radar transmission signal 411*a* generated based on the individual transmission pulse signal 411 included in the unit burst signal 410.

For example, tap information 420 (for example, a correlation graph) calculated with respect to an arbitrary pulse signal (for example, a signal radiated from a first transmitter Tx #1 and received at a third receiver Rx #3) may include correlation values in "$K_{tap}$" tap indices. The radar data recognition apparatus may select a portion of tap indices of correlation information. For example, the radar data recognition apparatus may select "K" tap indices in a single pulse. In this example, $K_{tap}$ is an integer greater than or equal to "1" and K is an integer greater than or equal to "1" and less than or equal to "$K_{tap}$". "$K_{tap}$" may be set based on a resolution set as a target for the radar sensor, and based on a maximum sensible range of the radar sensor. The radar data recognition apparatus may acquire correlation values for a single pulse for each of the selected "K" tap indices as tap information 420. FIG. 4 illustrates an example in which K is "5". For example, the radar data recognition apparatus may acquire five correlation values 421, 422, 423, 424 and 425 in the selected tap indices as tap information 420 for the transmission pulse signal 411 and the reception pulse signal 412.

For example, for the unit burst signal 410, "K" values may be acquired for each of "N×M" correlation graphs, and thus a total of "N×M×K" values may be acquired. In FIG. 4, the radar data recognition apparatus may generate a correlation graph including "$K_{tap}$=256" correlation values for a single pulse, and may generate "N×M=5×5=25" correlation graphs for the unit burst signal 410. The radar data recognition apparatus may acquire "K=5" correlation values as the tap information 420 in the correlation graph calculated for individual pulse signals, for example, the transmission pulse signal 411 and the reception pulse signal 412. Thus, the radar data recognition apparatus may acquire "N×M×K=5×5×5=125" correlation values for the unit burst signal 410.

A tap index of a peak point 424 in correlation information between the transmission pulse signal 411 and the reception pulse signal 412 may correspond to a time at which the reception pulse is delayed with respect to the transmission pulse. When radar signal is propagated at a velocity of light that is a constant number, a delay in time between the radar transmission signal 411*a* and the radar reception signal may correspond to a range to a target point from which the radar signal is reflected. Thus, the tap information 420 acquired from individual pulse signals, for example, the transmission pulse signal 411 and the reception pulse signal 412, may include information associated with a range component to the target point.

Hereinafter, non-limiting examples of a burst signal as a signal associated with angle information, a frame signal as a signal associated with velocity information, and a series of frame signals as signals associated with a time change are described below with reference to FIG. 5. When signal forms of a plurality of burst signals within a single frame are different from each other with respect to a target of which a velocity changes, the radar data recognition apparatus may estimate a velocity based on a change in the burst signals.

Figure 5:
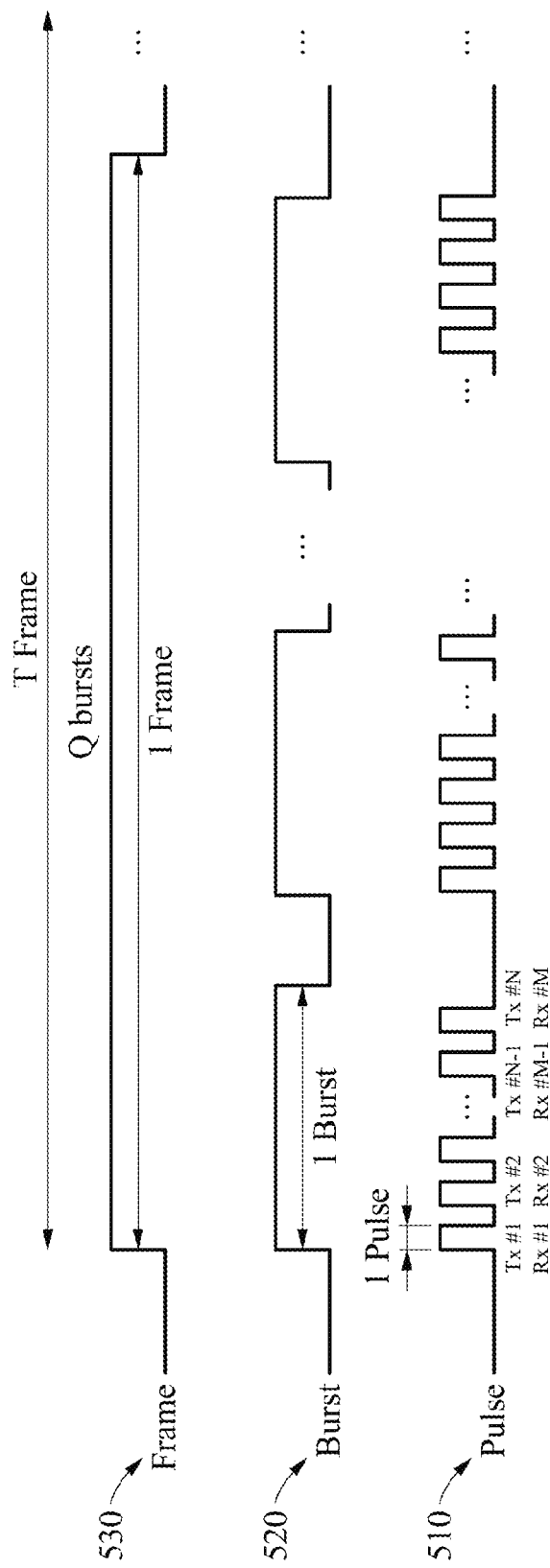
FIG. 5 illustrates an example of a pulse signal, a burst signal, and a frame signal in radar data.

FIG. 5 illustrates an example of a pulse signal, a burst signal and a frame signal in radar data.

Angle information may indicate information associated with an angle of arrival (AoA) of a radar signal received from a target point. The angle information may be information associated with an angle component that may be used to calculate an AoA value. For example, a component dependent on an AoA from the target point toward a radar sensor among components of radar data may be referred to as an angle component. The angle information may correspond to, for example, a burst signal 520.

For example, the burst signal 520 may include a plurality of pulse signals 510. A unit burst signal may include "P" pulse signals where P is an integer greater than or equal to "2". When radar transmission signals based on a plurality of transmission pulse signals (for example, "P" transmission pulse signals) are reflected from one target point, each of a plurality of reception antennas may receive radar reception signals with different phases with respect to a corresponding radar transmission signal. Thus, an AoA from the radar sensor toward the target point may be determined from the above-described phase difference. For example, a radar data recognition apparatus (for example, the radar data recognition apparatus 200) using an FMCW radar may generate beat signals corresponding to a plurality of pulse signals from a difference between a radar transmission signal and a radar reception signal. As described above, the beat signals may have different phases. A phase difference between the beat signals may be a component corresponding to an AoA. In other words, when the burst signal 520 includes the plurality of pulse signals 510, information associated with an angle component may be extracted from the burst signal 520.

For example, the angle information may include elevation angle information and horizontal angle information. Based on an arrangement of a transmission antenna and a reception antenna, either one or both of the elevation angle information and the horizontal angle information may be acquired based on radar data. The elevation angle information may indicate an elevation angle at which the target point is located based on the radar sensor, and the horizontal angle information may indicate a horizontal angle at which the target point is located based on the radar sensor. However, the AoA is not limited to being defined by the horizontal angle and the elevation angle and may vary depending on a configuration.

Velocity information may indicate information associated with a velocity of the target point. The velocity information may be information associated with a velocity component that may be used to calculate a velocity value of the target point. The velocity value of the target point may be, for example, a doppler velocity value that is based on the radar sensor. For example, a component dependent on the velocity of the target point among the components of the radar data may be referred to as a velocity component. The velocity information may correspond to, for example, a single frame signal 530. For example, the single frame signal 530 may include a plurality of burst signals. A unit frame signal may include "Q" burst signals where Q is an integer greater than or equal to "2". In an example, for a stationary target, almost the same beat signals may be obtained even though ten burst signals are radiated. In another example, for a moving target, ten different beat signals may be obtained with respect to ten burst signals when a position (for example, a range) of the target changes when the target moves. Thus, a velocity of the target may be estimated from the plurality of burst signals.

Time frame information may indicate information associated with a time change. The time frame information may be information associated with a time change component that may be used to calculate any one or any combination of a change in a range, a change in an angle, and a change in a velocity at the target point over time. For example, a component dependent on a time change among the components of the radar data may be referred to as a frame component. The time frame information may correspond to, for example, a series of frame signals. A series of frame signals included in the radar data may be "T" frame signals where T is an integer greater than or equal to "2". As described above, when a single frame signal includes a pulse signal and a burst signal, a velocity, an angle, and a range of a target may be estimated from the signal frame signal. Thus, change information (for example, a movement) of a corresponding target over time may be estimated based on a plurality of frame signals.

The radar data recognition apparatus may acquire "K" correlation values from one pulse signal 510 as described above with reference to FIG. 4. A correlation value may be represented by an in-phase (I) signal indicating a real number part and a quadrature (Q) signal indicating an imaginary number part. Thus, "K×2" values may be acquired from one pulse signal 510. Also, the radar data recognition apparatus may receive pulse signals 510 corresponding to a number "N" of transmission antennas and a number "M" of reception antennas. For example, when a unit burst signal includes "N×M" pulse signals, the radar data recognition apparatus may acquire "N×M×K×2" values from the unit burst signal. When the unit frame signal includes "0" burst signals, "N×M×K×2×Q" values may be acquired from the unit frame signal. When the radar data includes "T" frame signals, a total of "N×M×K×2×Q×T" values may be acquired from the radar data. As a result, the radar data may have six dimensions.

Although the range information, the angle information, the velocity information, and the time frame information have been described above for convenience of description, examples are not limited thereto. For example, range-velocity information may be information associated with a velocity and a range of the target point, and may indicate information associated with a range-velocity component that may be used to calculate a value of a range to the target point and a value of the velocity of the target point. The range-velocity information may correspond to, for example, a combination of the pulse signal 510 and the frame signal 530. Non-limiting examples of input data that is converted from radar data and associated with an angle dimension, a range-velocity dimension, and a time frame dimension will be described below with reference to FIG. 6. The input data may have a reduced dimension in comparison to that of the radar data.

Figure 6:
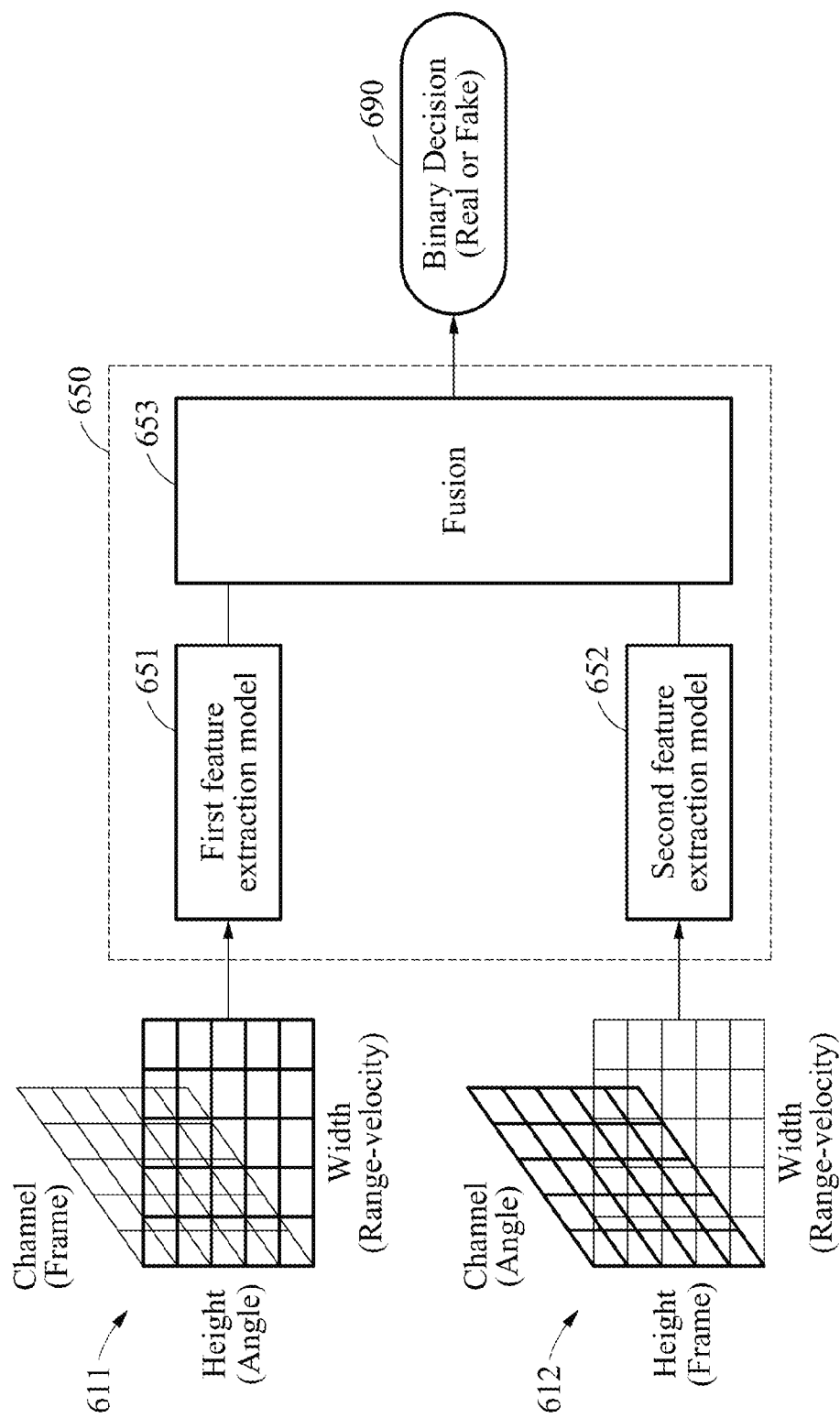
FIG. 6 illustrates an example of a recognition model that generates a recognition result from input data generated from radar data.

Also, in a non-limiting example of the present disclosure, in addition to determining a range value, an angle value, and a velocity value based on each respective component information of the radar data (for example, range information, angle information, and velocity information of the radar data), the radar data recognition apparatus may configure a dimension of input data based on each component in radar data and generate a recognition result from a plurality of pieces of input data using a recognition model, non-limiting examples of which will be described below with reference to FIG. 6.

Hereinafter, a non-limiting example of a bi-directional CNN will described below with reference to FIG. 6.

FIG. 6 illustrates an example of a recognition model that generates a recognition result from input data generated from radar data.

A radar data recognition apparatus (for example, the radar data recognition apparatus 200) may generate input data by reducing a dimension of radar data. For example, the radar data may have six dimensions (for example, a transmission antenna dimension, a reception antenna dimension, a tap dimension, an IQ dimension, a burst dimension, and a time frame dimension, as described above). To input the radar data to a recognition model, the radar data recognition apparatus may apply a dimensionality reduction to the radar data. For example, the radar data recognition apparatus may generate the input data by classifying the radar data into a dimension (hereinafter, referred to as an "angle dimension") associated with an angle component, a dimension (hereinafter, referred to as a "range dimension") associated with a range component, a dimension (hereinafter, referred to as a "velocity dimension") associated with a velocity component, and a dimension (hereinafter, referred to as a "time frame dimension") associated with a time frame component.

As described above with reference to FIG. 5, a pulse signal may be associated with the range component, a frame signal may be associated with the velocity component, a burst signal may be associated with the angle component, and a frame signal may be associated with the time frame component. Thus, where the angle dimension="N×M", the range-velocity dimension="K×2×0", and the time frame dimension="T", the input data may have a dimension configuration of "(angle dimension)×(range-velocity dimension)×(time frame dimension)=(N×M)×(K×2×Q)×T". In an example of N=M=K=5, Q=15, and T=150, the input data may have a dimension of "(angle dimension)×(range-velocity dimension)×(time frame dimension)=25×150×150". However, the dimensionality reduction of the radar data is not limited to the above description, and may vary depending on a configuration.

The input data may be data with a dimension less than that of the radar data, and may include an input map corresponding to a plurality of channels. For example, when a number of channels is "C", the input data may include "C" input maps. In this example, C is an integer greater than or equal to "1". The input data may be three-dimensional (3D) data when the input data is generated to include a same number of input maps as a number of channels, for example. In FIG. 6, the radar data recognition apparatus may generate a plurality of pieces of input data configured with a combination of the angle dimension, the range-velocity dimension, and the time frame dimension from the radar data.

For each channel based on a portion of components of the radar data, the radar data recognition apparatus may generate an input map of another portion of the components as each of the plurality of pieces of input data. For example, the radar data recognition apparatus may select one dimension among the angle dimension, the range-velocity dimension, and the time frame dimension as a channel of the input data, and may select another dimension for the input map. For example, the radar data recognition apparatus may generate a first input map with the angle dimension and the range-velocity dimension for each time frame channel as first input data 611. For example, each channel of the first input data 611 may correspond to an angle component and a range-velocity component of a respective frame. The radar data recognition apparatus may generate a second input map with the time frame dimension and the range-velocity dimension for each angle channel as second input data 612. For example, each channel of the second input data 612 may correspond to a frame component and a range-velocity component of a respective angle. A height and a width of the first input map may respectively correspond to the angle dimension and the range-velocity dimension and a height and a width of the second input map respectively correspond to the time frame dimension and the range-velocity dimension as shown in FIG. 6 for convenience of description, however, examples are not limited thereto. In the above example, a number of channels of the first input data 611 may be "150" that is a number of time frames, and a dimension of the first input map may be "(angle dimension)×(range-velocity dimension)=25×150". Also, a number of channels of the second input data 612 may be "25" that is a number of channel angles, and a dimension of the second input map may be "(time frame dimension)×(range-velocity dimension)=150×150".

The radar data recognition apparatus may implement a recognition model 650 by inputting each input data to the recognition model 650. For example, the recognition model 650 may include a plurality of feature extraction models that are distinguished from each other, and the radar data recognition apparatus may input the plurality of pieces of input data to different feature extraction models, respectively. For example, the radar data recognition apparatus may input the first input data 611 to a first feature extraction model 651 and input the second input data 612 to a second feature extraction model 652.

The first feature extraction model 651 may be a model configured to extract first feature data from the first input data 611, and the second feature extraction model 652 may be a model configured to extract second feature data from the second input data 612. For example, an input layer of the first feature extraction model 651 may have a structure configured to receive the first input data 611, and an input layer of the second feature extraction model 652 may have a structure configured to receive the second input data 612. When formats of individual input data are different from each other, structures of input layers of feature extraction models may also be different from each other. Also, each of the feature extraction models may be trained independently of another feature extraction model, and accordingly trained parameters of the feature extraction models may be different from each other.

The radar data recognition apparatus may individually extract a plurality of pieces of feature data from the plurality of pieces of input data using a plurality of feature extraction models included in the recognition model 650. The radar data recognition apparatus may extract feature data by applying a convolution operation based on a feature extraction model corresponding to each input data. The radar data recognition apparatus may perform a convolution operation while sweeping a kernel filter of a feature extraction model separately for input maps of each input data. For example, the radar data recognition apparatus may extract the first feature data by applying a convolution operation based on the first input data 611 using the first feature extraction model 651. The radar data recognition apparatus extracts the second feature data by applying a convolution operation based on the second input data 612 using the second feature extraction model 652.

The radar data recognition apparatus may generate a recognition result 690 based on the plurality of pieces of extracted feature data. In an example, the radar data recognition apparatus may generate combined feature data by fusing the plurality of pieces of extracted feature data. In fusion operation 653, the radar data recognition apparatus may calculate the combined feature data by summing the plurality of pieces of extracted feature data for each element. Dimensions of feature data generated by each of the feature extraction models may be identical to each other. However, the fusion operation 653 is not limited thereto, and includes, for example, various operations of merging the plurality of pieces of feature data into a single piece of data (for example, vector type data or matrix type data). Also, the fusion operation 653 may be implemented by a structure of a neural network, for example, a fully connected layer.

The radar data recognition apparatus may generate the recognition result 690 based on the combined feature data. For example, the radar data recognition apparatus may generate authenticity information as the recognition result 690. In an example, when an i sensed by a radar sensor is a real object, the radar data recognition apparatus may output a value indicating the real object. In another example, when the object is a fake object, the radar data recognition apparatus may output a value indicating the fake object. Accordingly, the radar data recognition apparatus of one or more embodiments may improve the functioning of computers and the technology fields of image recognition and liveness verification by generating a recognition result and authenticity information based on any one or any combination of an angle component, a range component, a velocity component, and a time frame component of radar data, thereby generating more accurate recognition results and authenticity information compared to a typical radar data recognition apparatus which may generate a recognition result and/or authenticity information that is spatially invariant. For example, when the object sensed by the radar data includes is a paper or a tablet displaying a face, the radar data recognition apparatus of one or more embodiments may use the spatially variant components of the radar data to detect or indicate the fake object more accurately than the typical radar data recognition apparatus which may indicate whether the object is a fake object based on spatially invariant input data. Moreover, the radar data recognition apparatus of one or more embodiments may improve the functioning of computers and the technology fields of image recognition and liveness verification by generating a recognition result and authenticity information using a multi-directional CNN where a component of the radar data used to determine a channel dimension for a first input data is also used to determine a dimension of an input map of a second or third input data, such that a correlation between the component and other components of the radar data is considered in generating the recognition result and authenticity information, thereby generating more accurate recognition results and authenticity information compared to a typical radar data recognition apparatus in which a correlation between the component of the radar data used to determine a channel dimension and other components of the radar data is not considered.

Figure 7:
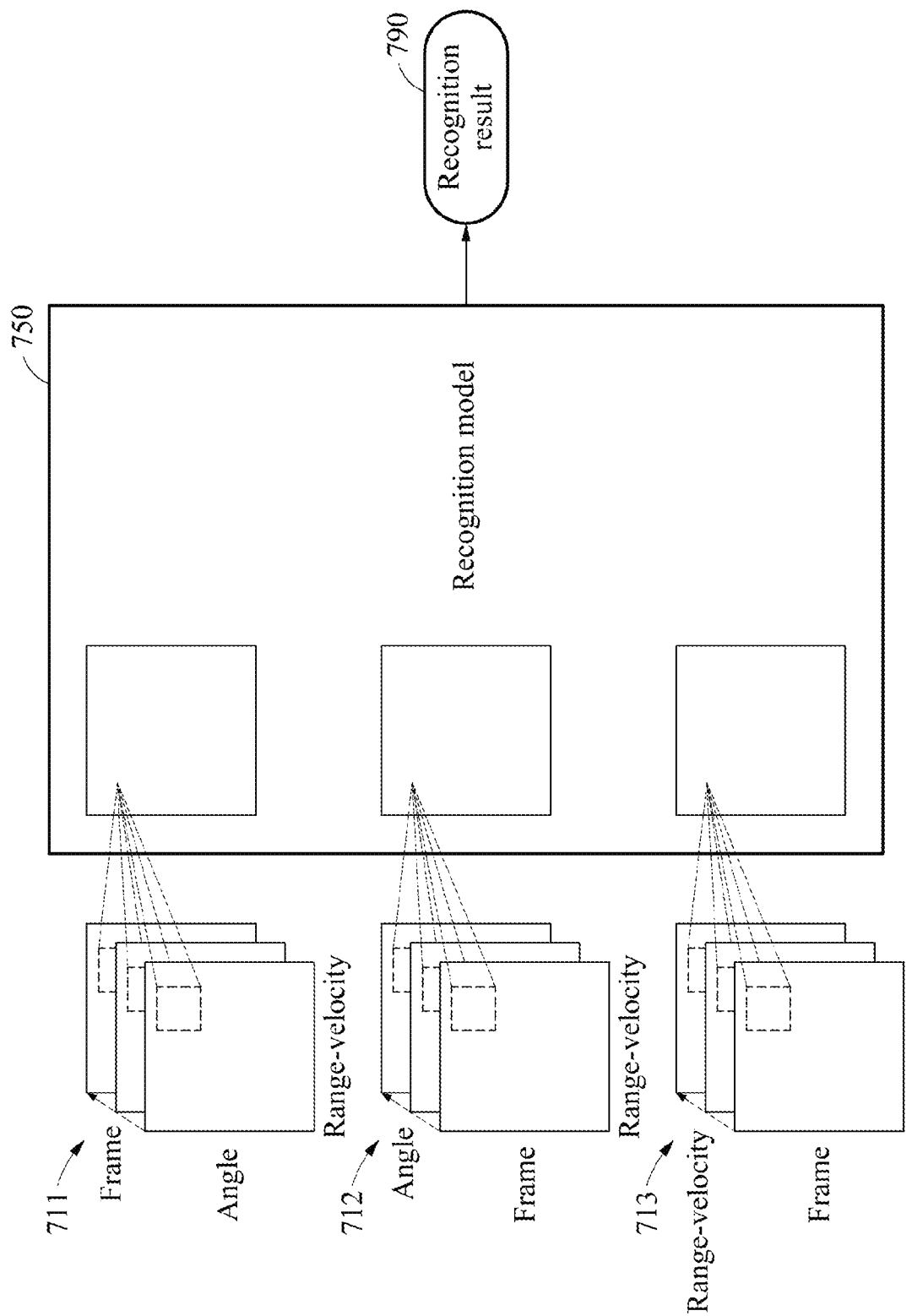
FIG. 7 illustrates an example of generated input data.

FIG. 7 illustrates an example of generated input data.

A radar data recognition apparatus (for example, the radar data recognition apparatus 200) may generate at least three pieces of input data from radar data. First input data 711 may correspond to first input data 611 and second input data 712 may correspond to second input data 612 as described above with reference to FIG. 6, and further description thereof is omitted herein. The radar data recognition apparatus may generate third input data 713 including a third input map with a time frame dimension and an angle dimension for each range-velocity channel.

Also, an input map of one piece of input data among a plurality of pieces of input data may have the same dimension as at least one dimension of an input map of another piece of input data. In other words, at least a portion of dimension components constituting a spatial domain of an input map of one piece of input data may overlap a dimension component constituting a spatial domain of an input map of another piece of input data. For example, both a first input map of the first input data 711 and a second input map of the second input data 712 may have range-velocity dimensions, both the first input map and the third input map may have angle dimensions, and both the second input map and the third input map may have time frame dimensions.

The radar data recognition apparatus may generate a recognition result 790 by applying a recognition model 750 to each of the first input data 711 through the third input data 713. For example, the radar data recognition apparatus may extract first feature data from the first input data 711, extract second feature data from the second input data 712, and extract third feature data from the third input data 713 using feature extraction models of the recognition model 750. Similar to the example of FIG. 6, a feature extraction model to which each input data is input may be different from another feature extraction model in a structure (for example, a number of input nodes) of an input layer and a trained parameter. The radar data recognition apparatus may output the recognition result 790 based on combined feature data generated by fusing extracted feature data.

Figure 8:
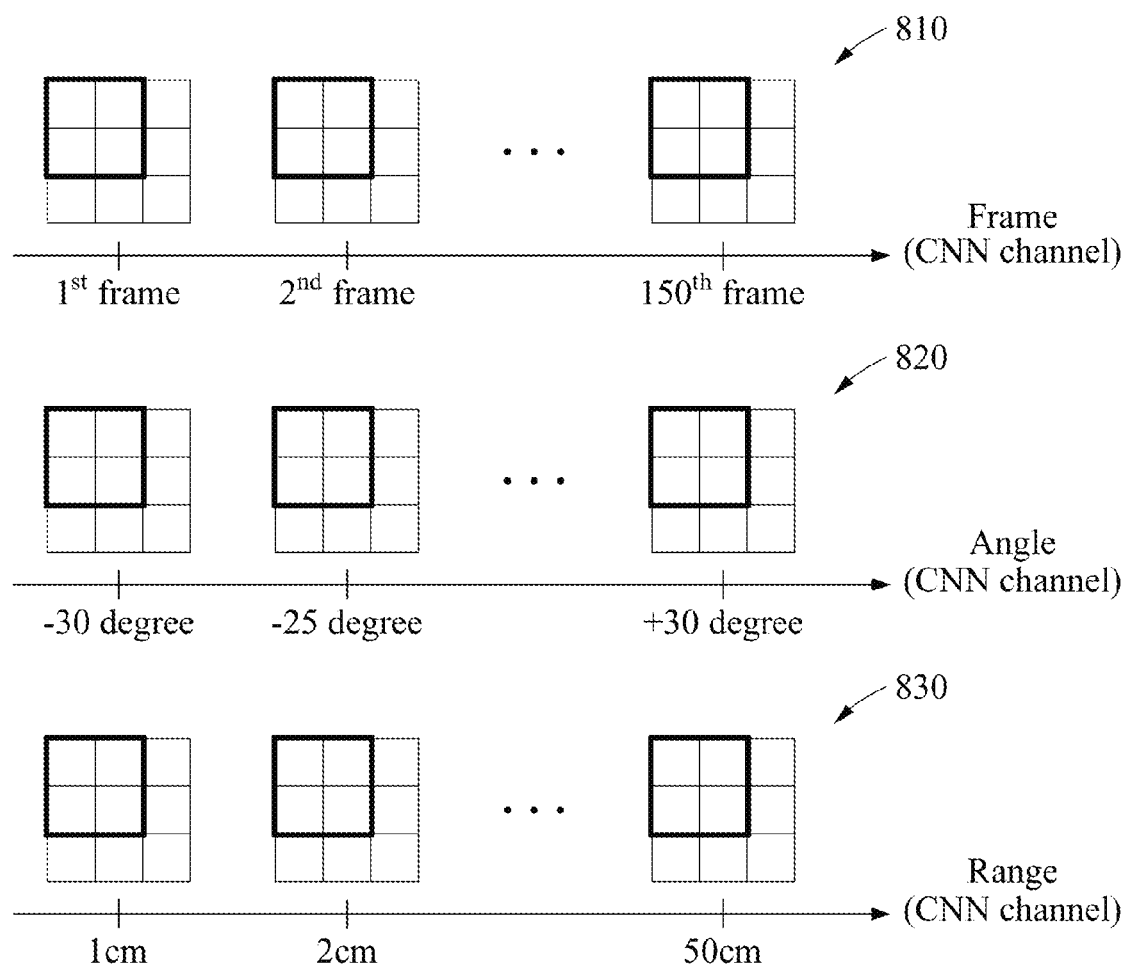
FIG. 8 illustrates an example of a kernel filter applied to input data.

FIG. 8 illustrates an example of a kernel filter applied to input data (for example, the input data of FIG. 7).

A radar data recognition apparatus (for example, the radar data recognition apparatus 200) may extract a plurality of pieces of feature data by applying a convolution filtering to a plurality of pieces of input data. For example, the radar data recognition apparatus may extract the plurality of pieces of feature data from each of the plurality of pieces of input data by performing a convolution operation while sweeping an input map of each channel with a different kernel filter for each channel.

In the example of FIG. 7, the first input data 711 may include a first input map with an angle dimension and a range-velocity dimension for each time frame channel. The first feature extraction model may have at least one first kernel filter 810 used to sweep the first input map. In FIG. 8, a channel based on a time frame may be set in units of one time frame, and the first feature extraction model may have a kernel filter 810 corresponding to an individual time frame (for example, a first frame, a second frame, or a 150th frame). For example, the at least one kernel filter 810 may include or represent a plurality of kernel filters 810, wherein each of the kernel filters 810 corresponds to a respective time frame. For example, the radar data recognition apparatus may perform a convolution filtering of an input map for each time frame channel using a kernel filter 810 (hereinafter, referred to as a "frame kernel") set for each time frame channel. The radar data recognition apparatus may apply a convolution operation to a first input map corresponding to a first time frame among first input maps by sweeping a first frame kernel 810, and may apply a convolution operation to a first input map corresponding to a second time frame by sweeping a second frame kernel 810. The radar data recognition apparatus may apply a convolution operation to a first input map corresponding to a last time frame (for example, a 150$^{th}$ time frame of FIG. 8) by sweeping a last frame kernel 810. The radar data recognition apparatus may extract first feature data through a convolution operation and sweeping of a frame kernel 820 corresponding to each of a plurality of first input maps, with respect to each of the plurality of first input maps.

Similarly, a second feature extraction model may have at least one second kernel filter 820 used to sweep a second input map. In FIG. 8, channels based on angles may be set in units of 5 degrees within a range of −30 degrees to 30 degrees, and the second feature extraction model may have a kernel filter 820 corresponding to an individual angle, for example, −30 degrees, −25 degrees or 30 degrees). For example, the at least one kernel filter 820 may include a plurality of kernel filters 820, wherein each of the kernel filters 820 corresponds to a respective angle. For example, the radar data recognition apparatus may perform a convolution filtering of an input map for each angle channel using a kernel filter 820 (hereinafter, referred to as an "angle kernel") set by an angle channel. The radar data recognition apparatus may apply a convolution operation to a second input map corresponding to a first angle among second input maps by sweeping a first angle kernel 820, and may apply a convolution operation to a second input map corresponding to a second time frame by sweeping a second angle kernel 820. The radar data recognition apparatus may apply a convolution operation to each of second input maps corresponding to the other angle channels by separately sweeping angle kernels 820. The radar data recognition apparatus may extract second feature data through a convolution operation and sweeping of a angle kernel 820 corresponding to each of a plurality of second input maps, with respect to each of the plurality of second input maps.

Similarly to the above-described feature models, a third feature extraction model also may have a third kernel filter 830. The radar data recognition apparatus may extract third feature data by applying a convolution operation to a third input map corresponding to an individual range (for example, 1 centimeters (cm), 2 cm, or 50 cm) among third input maps by sweeping a corresponding range kernel 830.

The above-described kernel filters 810, 820, and 830 may each have a parameter that is trained based on a presence or an absence of a target point based on a dimension component of an input map for each channel for which a corresponding kernel filter is set. For example, the frame kernel 810 that is an example of a kernel filter of the first feature extraction model may have, as a kernel element, a parameter that is trained on a presence or an absence of a target point within an angle and a range permitted for each time frame. Also, the angle kernel 820 that is an example of a kernel filter of the second feature extraction model may have, as a kernel element, a parameter that is trained on a presence or an absence of a target point at ranges-velocities for each angle based on a time change. The range kernel 830 that is an example of a kernel filter of the third feature extraction model may have, as a kernel element, a parameter that is trained on a presence or an absence of a target point at angles for each range based on a time change.

Although a single kernel filter may be set for each channel with respect to one piece of input data for convenience of description, examples are not limited thereto. Although a single kernel set for a first time frame channel among a plurality of time frame channels in the first kernel filter 810 is shown in FIG. 8, a plurality of kernels may be set depending on a configuration.

Since dimension components constituting an input map in 2D are spatially related to each other, a recognition model may learn channel information that is based on all signal relationships between a range-velocity dimension, an angle dimension, and a time frame dimension. Also, the recognition model may learn characteristics of unique information of a radar (for example, information about a range, a velocity, and an angle). For example, information (for example, a time frame channel in an example of first input data) of a channel of one piece of input data may be set as spatial information (for example, time frame dimensions of input maps of second input data and third input data) of an input map of another pieces of input data, and accordingly the recognition model may learn a correlation between a dimension component set as a channel component of one piece of input data and set as a dimension component of another piece of input data. Also, the recognition model may be trained for each range component, for each velocity component, and for each angle component.

For example, when channel information is not related to spatial information, that is, when only a single piece of input data is generated from radar data, a corresponding neural network may learn spatial invariant information. In this example, the neural network may learn a presence or an absence of a target point regardless of whether a range is 10 meters (m) or 20 m. In a liveness verification (for example, a verification of whether an object is a real object or a fake object), a single face of a person may be detected as a target in response of the object being the real object. However, when the object is a fake object (for example, a face printed on paper and a face printed using a tablet personal computer (PC)), at least two targets (for example, a pair of a sheet of paper and a hand, or a pair of the tablet PC and a hand) may be represented. To spatially and temporally distinguish the above targets, training by ranges, by angles, and by time changes may be required. As a result, the recognition model may exhibit an enhanced accuracy even through radar data includes a relatively small number of frames (for example, "T").

Although the range-velocity dimension, the time frame dimension, and the angle dimension have been described as examples of dimension components constituting input data, a range dimension, a velocity dimension, a time frame dimension, a horizontal angle dimension, and an elevation angle dimension are described below with reference to FIG. 9 as further non-limiting examples of dimension components constituting input data.

Figure 9:
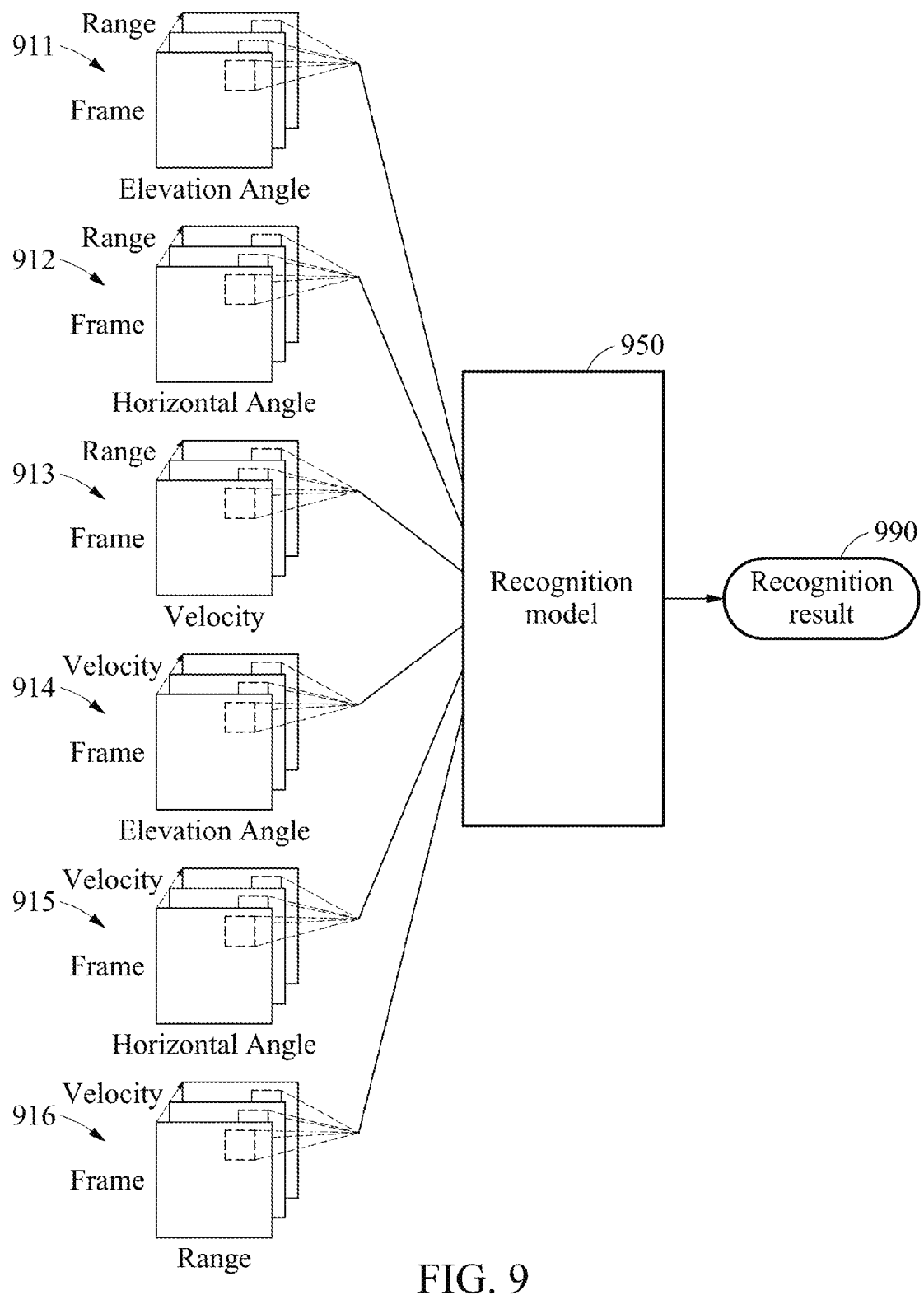
FIG. 9 illustrates an example of input data.

FIG. 9 illustrates an example of input data.

A radar data recognition apparatus (for example, the radar data recognition apparatus 200) may select data corresponding to a portion of dimension components of radar data, and generate input data from the selected data. For example, the radar data may be represented by components of a range dimension, a velocity dimension, a time frame dimension, a horizontal angle dimension, and an elevation angle dimension, and the radar data recognition apparatus may select data corresponding to three dimension components and generate input data. As described above, one of the three dimension components may constitute a channel of the input data, and the other dimension components may constitute an input map. A plurality of pieces of input data (for example, first input data 911, second input data 912, third input data 913, fourth input data 914, fifth input data 915, and sixth input data 916 shown in FIG. 9) may correspond to a portion of possible combinations from the above-described radar data.

Also, the radar data recognition apparatus may generate input data of which time frame information is spatially related to angle information and range information. For example, one dimension of an input map of at least one piece of input data among the plurality of pieces of input data may be a dimension of a time frame. In this example, the input map may include spatial information including time frame information together with at least one of the angle information and the range information.

In FIG. 9, all input maps of the first input data 911, the second input data 912, the third input data 913, the fourth input data 914, the fifth input data 915, and the sixth input data 916 may have time frame dimensions. For example, the first input data 911 may include information about a presence or an absence of a target point at elevation angles based on a time change, for each range; the second input data 912 may include information about a presence or an absence of a target point at horizontal angles based on a time change, for each range; and the third input data 913 may include information about a presence or an absence of a target point at velocities based on a time change, for each range. The fourth input data 914 may include information about a presence or an absence of a target point at elevation angles based on a time change, for each velocity; the fifth input data 915 may include information about a presence or an absence of a target point at horizontal angles based on a time change, for each velocity; and the sixth input data 916 may include information about a presence or an absence of a target point at ranges based on a time change, for each velocity.

The radar data recognition apparatus may generate a recognition result 990 by applying a recognition model 950 to the first input data 911 through the sixth input data 916.

Dimension configurations of the plurality of pieces of input data of FIG. 9 are merely an example, and a dimension configuration of individual input data may vary depending on a configuration.

Figure 10:
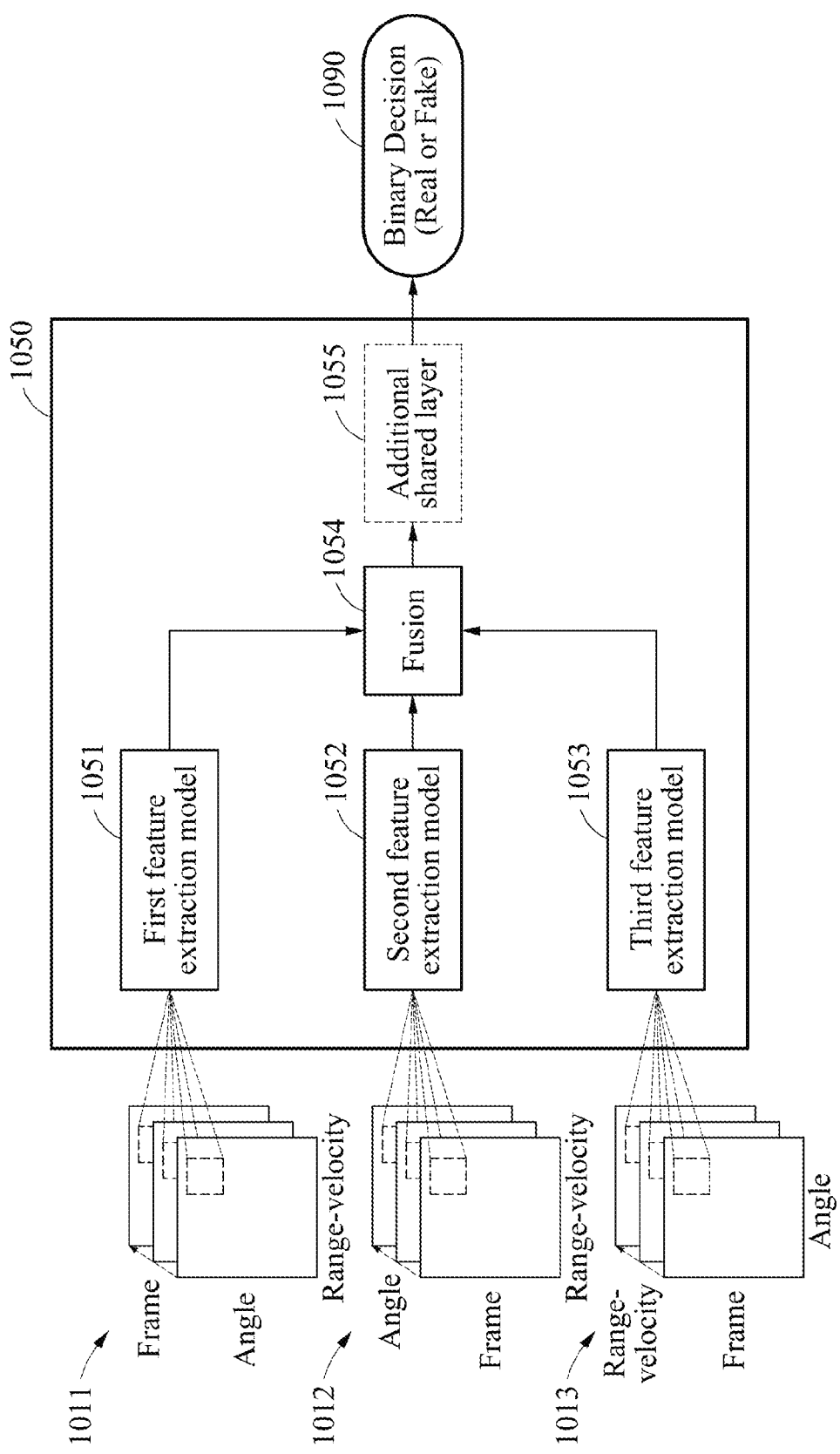
FIG. 10 illustrates an example of combined feature data based on a fusion of feature data and an example of a recognition result based on the combined feature data.

FIG. 10 illustrates an example of combined feature data based on a fusion of feature data and an example of a recognition result based on the combined feature data.

A recognition model 1050 may further include an additional shared layer 1055 applied to combined feature data generated by a fusion operation 1054 of feature data generated by each feature extraction model. The additional shared layer 1055 may have a structure of a neural network (for example, at least one fully connected layer and/or at least one convolution layer). Each of a first feature extraction model 1051, a second feature extraction model 1052, and a third feature extraction model 1053 may have a structure that is distinct from or independent of that of another feature extraction model. The additional shared layer 1055 may be applied to the combined feature data. In an example, first input data 1011, second input data 1012, and third input data 1013 may be similar to those of FIGS. 6 and 7 (for example, may respectively correspond to the first input data 711, the second input data 712, and the third input data 713), and thus further description thereof is omitted herein.

A radar data recognition apparatus (for example, the radar data recognition apparatus 200) may generate a recognition result 1090 by propagating the combined feature data to the additional shared layer 1055.

The recognition model 1050 may be trained by a back-propagation scheme. For example, a training apparatus may input a plurality of training inputs to each of temporary feature extraction models in a temporary recognition model 1050, and may propagate the training inputs through the additional shared layer 1055, to calculate a temporary output. The training apparatus may calculate a loss between the temporary output and a training output (for example, ground truth (GT) data) and may update a parameter of the temporary recognition model 1050 to reduce the calculated loss. The training apparatus may repeat a process of calculating the loss and updating the parameter until the loss converges to a value less than a threshold, or may repeat updating of the parameter a predetermined number of times. However, training is not limited thereto. The training apparatus may be combined with the radar data recognition apparatus, however, examples are not limited thereto. For example, a recognition model completely trained by a separate training apparatus may be generated, and the radar data recognition apparatus may receive the completely trained recognition model.

Figure 11:
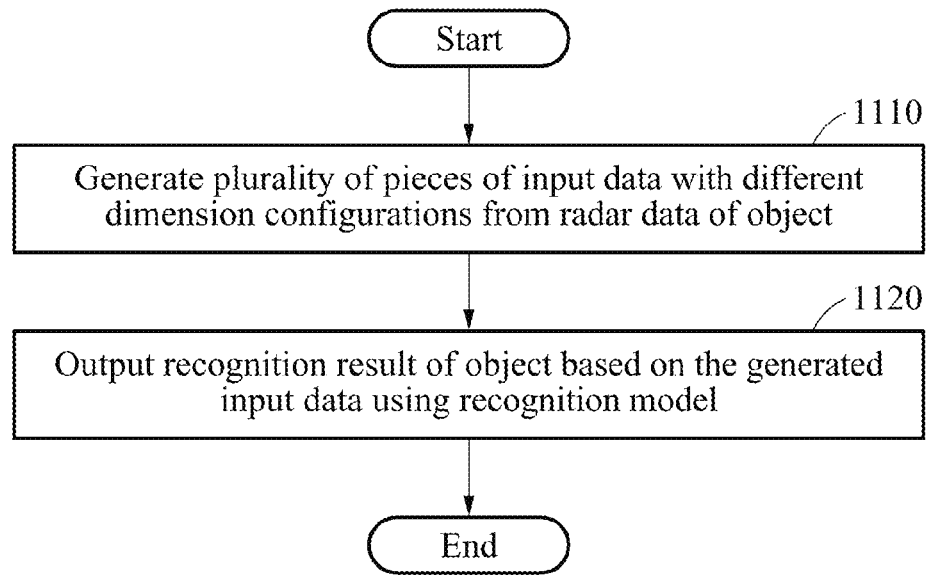
FIG. 11 illustrates an example of a radar data recognition method.

FIG. 11 illustrates an example of a radar data recognition method.

Referring to FIG. 11, in operation 1110, a radar data recognition apparatus (for example, the radar data recognition apparatus 200) may generate a plurality of pieces of input data with different dimension configurations from radar data of an object. The dimension configurations of input data may be the same as those described above with reference to FIGS. 6 through 10.

In operation 1120, the radar data recognition apparatus may output a recognition result of the object based on the plurality of pieces of generated input data using a recognition model.

However, the radar data recognition method is not limited to the above description, and the radar data recognition method may be performed in a time series manner or in parallel with at least one of the operations described above with reference to FIGS. 1 through 10.

Figure 12:
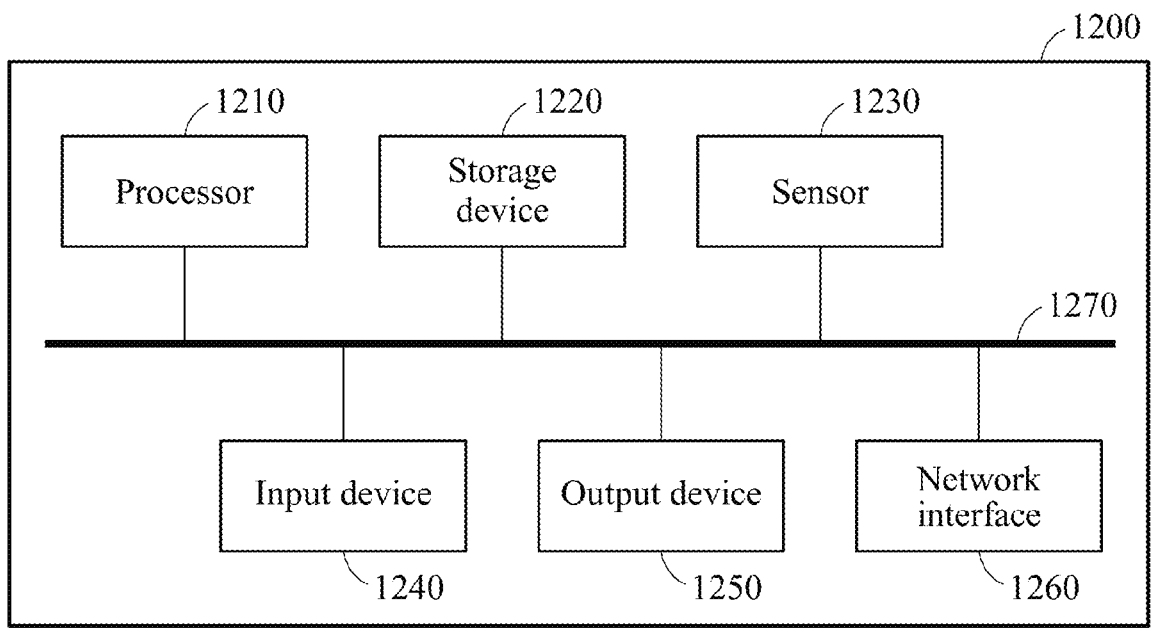
FIG. 12 illustrates an example of a computing apparatus.

FIG. 12 illustrates an example of a computing apparatus 1200.

Referring to FIG. 12, a computing apparatus 1200 may be an apparatus configured to recognize radar data using the above-described radar data recognition method of FIG. 11. The computing apparatus 1200 may correspond to, for example, the radar data recognition apparatus 200. The computing apparatus 1200 may be or include, for example, an image processing apparatus, a smartphone, a wearable device, a tablet computer, a netbook, a laptop computer, a desktop computer, a personal digital assistant (PDA), a set-top box, a home appliance, a biometric door lock, a security device, a financial transaction device, a vehicle start device, or an autonomous vehicle. The computing apparatus 1200 may perform the same functions of those of the radar data recognition apparatus 200 of FIG. 2.

Referring to FIG. 12, the computing apparatus 1200 may include a processor 1210 (for example, one or more processors), a storage device 1220, a sensor 1230, an input device 1240, an output device 1250, and a network interface 1260. The processor 1210, the storage device 1220, the sensor 1230, the input device 1240, the output device 1250, and the network interface 1260 may communicate with one another through a communication bus 1270.

The processor 1210 may execute instructions and functions to be executed within the computing apparatus 1200. For example, the processor 1210 may process instructions stored in the storage device 1220. The processor 1210 may perform at least one operation described above with reference to FIGS. 1 through 11. The processor 1210 may generate a recognition result based on the above-described operation and grant an authority based on the recognition result. For example, in response to a verification that a user is registered in an electronic terminal and is a real object based on the recognition result, the processor 1210 may grant the authority. The processor 1210 may permit an access to at least one of data and an operation of the electronic terminal based on the authority. For example, when the electronic terminal is in a locked state, the processor 1210 may unlock the locked state of the electronic terminal based on the authority.

The storage device 1220 may store information or data used for execution of the processor 1210. The storage device 1220 may include a computer-readable storage medium or a computer-readable storage device. Also, the storage device 1220 may store instructions to be executed by the processor 1210, and information associated with execution of software or an application while the software or the application is being executed by the computing apparatus 1200.

The sensor 1230 may include a radar sensor configured to transmit and receive a radar signal. However, the sensor 1230 is not limited to the radar sensor, and the sensor 1230 may include, for example, various types of sensors such as a light detection and ranging (LiDAR) sensor configured to transmit and receive a lidar signal, or a camera sensor.

The input device 1240 may receive an input from a user through a tactile input, a video input, an audio input, or a touch input. For example, the input device 1240 may include, and/or detect an input from, a keyboard, a mouse, a touchscreen, a microphone, a user interface, or the user, and may include other devices configured to transfer the detected input.

The output device 1250 may provide a user with an output of the computing apparatus 1200 through a visual channel, an audio channel, or a tactile channel. The output device 1250 may include, for example, a display, a touchscreen, a speaker, a vibration generator, a user interface, or other devices configured to provide the user with the output. For example, when the recognition result is generated by the processor 1210, the output device 1250 may visualize the recognition result using a display. However, examples are not limited thereto. For example, when a recognition result indicating that a user is a real object is generated by the processor 1210, the output device 1250 may provide one or at least two combinations of visual information (for example, a graphics object), auditory information (for example, a guide voice) and haptic information (for example, a vibration) that indicate a recognition success. When a recognition result indicating that a user sensed by a radar sensor is a fake object is generated by the processor 1210, the output device 1250 may provide one or at least two combinations of visual information, auditory information and haptic information that indicate a recognition failure.

The network interface 1260 may communicate with an external device via a wired or wireless network.

The radar data recognition apparatuses, radar sensors, processors, memories, computing apparatuses, storage devices, sensors, input devices, output devices, network interfaces, communication buses, radar data recognition apparatus 200, radar sensor 210, processor 220, memory 230, computing apparatus 1200, processor 1210, storage device 1220, sensor 1230, input device 1240, output device 1250, network interface 1260, communication bus 1270, apparatuses, units, modules, devices, and other components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented radar data recognition method, the method comprising:
    generating a plurality of pieces of input data, with respectively different dimension configurations, based on radar data, measured using sensors, of an object; and
    performing a recognition operation of the object to output a recognition result of the object based on a plurality of pieces of extracted feature data extracted from the generated plurality of pieces of input data using a plurality of feature extraction models, respectively corresponding to the respectively different dimension configurations, included in a recognition model,
    wherein the generating of the plurality of pieces of input data comprises generating, based on the radar data:
        first input data of the plurality of pieces of input data comprising a first input map with an angle dimension and a range-velocity dimension for each time frame channel of the first input data;
        second input data of the plurality of pieces of input data comprising a second input map with a time frame dimension and the range-velocity dimension for each angle channel of the second input data; and
        third input data of the plurality of pieces of input data comprising a third input map with the time frame dimension and the angle dimension for each range-velocity channel of the third input data.

2. The method of claim 1, wherein the generating of the plurality of pieces of input data comprises generating, for each of the plurality of pieces of input data, an input map of a component of the radar data for each channel of the piece of input data, wherein each channel is dependent on another portion of the component of the radar data.

3. The method of claim 2, wherein
    the component of the radar data comprises any one of an angle component, a velocity component, and a time change component of the radar data, and
    the other component of the radar data comprises any other one of the angle component, the velocity component, and the time change component of the radar data of the radar data.

4. The method of claim 2, wherein an input map of one of the plurality of pieces of input data has a same dimension as one or more dimensions of an input map of another one of the plurality of pieces of input data.

5. The method of claim 2, wherein a dimension of an input map of one or more of the plurality of pieces of input data is a dimension of a time frame.

6. The method of claim 1, wherein the outputting of the recognition result comprises:
    extracting a plurality of pieces of feature data from the plurality of pieces of input data using the plurality of feature extraction models included in the recognition model; and
    generating the recognition result based on the plurality of pieces of extracted feature data.

7. The method of claim 6, wherein the extracting of the plurality of pieces of feature data comprises:
    extracting first feature data of the feature data from first input data of the plurality of pieces of input data using a first feature extraction model;

extracting second feature data of the feature data from second input data of the plurality of pieces of input data using a second feature extraction model; and generating the recognition result based on the first feature data and the second feature data.

8. The method of claim 6, wherein the extracting of the plurality of pieces of feature data comprises extracting the plurality of pieces of feature data by applying a convolution filtering to the plurality of pieces of input data.

9. The method of claim 8, wherein the extracting of the plurality of pieces of feature data comprises extracting the plurality of pieces of feature data from each of the plurality of pieces of input data by performing a convolution operation by sweeping an input map of each channel with a different kernel filter for each channel.

10. The method of claim 6, wherein each of the plurality of feature extraction models include differently trained parameters.

11. The method of claim 6, wherein each of the plurality of feature extraction models comprise one or more convolution layers.

12. The method of claim 6, wherein the generating of the recognition result comprises:

generating combined feature data by fusing the plurality of pieces of extracted feature data; and generating the recognition result based on the combined feature data.

13. The method of claim 12, wherein the generating of the combined feature data comprises summing corresponding elements of the plurality of pieces of extracted feature data.

14. The method of claim 13, wherein the generating of the recognition result comprises generating the recognition result by propagating the combined feature data to a shared layer of the recognition model.

15. The method of claim 1, wherein the outputting of the recognition result comprises outputting, as the recognition result, authenticity information indicating whether the object is a real object or a fake object.

16. The method of claim 1, further comprising:

granting an authority based on the recognition result; and permitting an access to either one or both of data and an operation of an electronic terminal based on the granted authority.

17. The method of claim 16, wherein the granting of the authority comprises granting the authority in response to a verification that a user is registered in the electronic terminal and the object is a real object based on the recognition result, and the permitting of the access comprises unlocking a locked state of the electronic terminal based on the authority.

18. The method of claim 1, further comprising:

in response to the recognition result being generated, visualizing the recognition result using a display.

19. A non-transitory computer-readable storage medium storing instructions that, when executed by a processor, configure the processor to perform the method of claim 1.

20. An apparatus, the apparatus comprising:

a radar sensor configured to acquire radar data of an object; and a processor configured to generate a plurality of pieces of input data with different dimension configurations based on the radar data measured using sensors, and perform, a recognition operation of the object to output a recognition result of the object based on a plurality of pieces of extracted feature data extracted from the generated plurality of pieces of input data using a plurality of feature extraction models, respectively corresponding to the respectively different dimension configurations, included in a recognition model, wherein the processor is further configured to generate based on the radar data:

first input data of the plurality of pieces of input data comprising a first input map with an angle dimension and a range-velocity dimension for each time frame channel of the first input data;

second input data of the plurality of pieces of input data comprising a second input map with a time frame dimension and the range-velocity dimension for each angle channel of the second input data; and third input data of the plurality of pieces of input data comprising a third input map with the time frame dimension and the angle dimension for each range-velocity channel of the third input data.

21. The apparatus of claim 20, further comprising:

a user interface, wherein the processor is configured to permit an access to an operation of the user interface based on the recognition result.

22. A processor-implemented radar data recognition method, the method comprising:

generating a plurality of pieces of input data, with respectively different dimension configurations, based on radar data, measured using sensors, of an object; and performing a recognition operation of the object to output a recognition result of the object based on a plurality of pieces of extracted feature data extracted from the generated plurality of pieces of input data using a plurality of feature extraction models, respectively corresponding to the respectively different dimension configurations, included in a recognition model, wherein the generating of the plurality of pieces of input data comprises generating the plurality of pieces of input data configured with a combination of an angle dimension, a range-velocity dimension, and a time frame dimension based on the radar data, wherein the angle dimension is determined based on a total number of transmission antennas and reception antennas included in a radar sensor, the range-velocity dimension is determined based on a total number of burst signals included in a frame signal of the radar data, and the time frame dimension is determined based on a total number of frame signals included in a series of frame signals of the radar data.

* * * * *